UNITED STATES PATENT OFFICE.

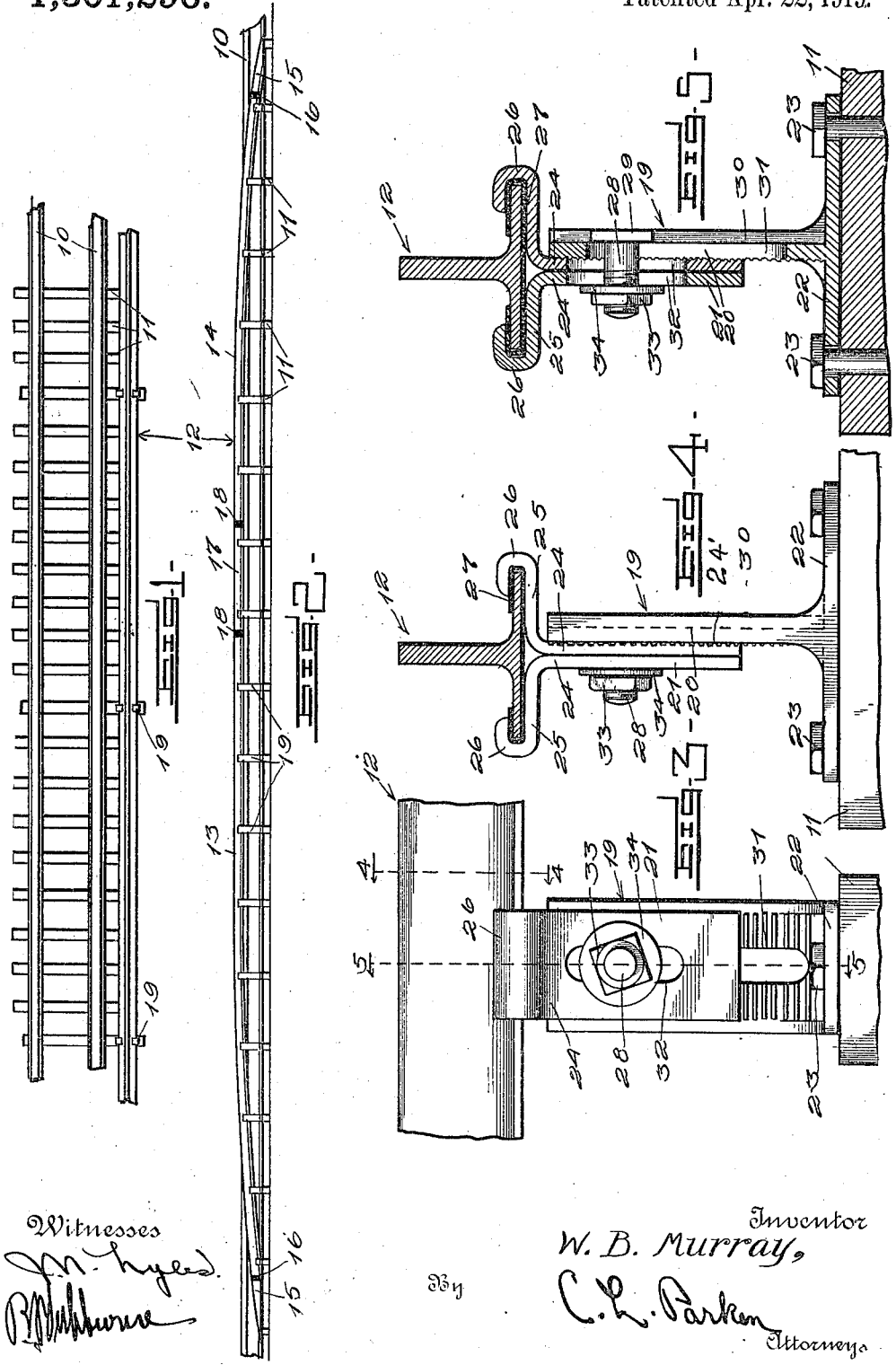

WILLIAM B. MURRAY, OF DANVILLE, ILLINOIS, ASSIGNOR TO THE MILLER TRAIN CONTROL CORPORATION, OF STAUNTON, VIRGINIA, A CORPORATION OF VIRGINIA.

RAMP AND ADJUSTABLE RAMP-SUPPORT.

1,301,296.      Specification of Letters Patent.      Patented Apr. 22, 1919.

Application filed March 16, 1914. Serial No. 824,985.

*To all whom it may concern:*

Be it known that I, WILLIAM B. MURRAY, a citizen of the United States, residing at Danville, in the county of Vermilion and State of Illinois, have invented certain new and useful Improvements in Ramps and Adjustable Ramp-Supports, of which the following is a specification.

My invention relates to improvements in ramps adapted for use in connection with train control systems, embodying mechanically operated and electrically controlled train stopping apparatus or mechanically operated and electrically controlled signaling apparatus or both, and also to adjustable means for holding the ramp or sections thereof in the proper vertical position or positions.

An important object of the invention is to provide a ramp of the above mentioned character, formed of a plurality of ramp-sections of the suitable length and having the suitable inclination to properly mechanically operate the electrically controlled train control apparatus.

A further object of the invention is to provide vertical adjustable or extensible supports, for holding the ramp or sections thereof, in adjustment in precisely the desired position, whereby the same will assume the proper angular position, such supports being strong, durable, simple in construction, inexpensive to manufacture, and convenient in use.

Other objects and advantages of the invention will be apparent during the course of the following description.

In the accompanying drawings forming a part of this specification and in which like numerals are employed to designate like parts throughout the same, Figure 1 is a plan view of a ramp and supports therefor, embodying my invention, Fig. 2 is a side elevation of the same, Fig. 3 is an enlarged side elevation of one of the adjustable supports, showing the same in use, Fig. 4 is a transverse sectional view taken on line 4—4 of Fig. 3, and, Fig. 5 is a similar view taken on line 5—5 of Fig. 3.

In the drawings, wherein for the purpose of illustration is shown a preferred embodiment of my invention, the numeral 10 designates traffic rails, secured in place upon cross ties 11 by means of spikes or the like, as is customary. Arranged preferably exteriorly of and near one of the traffic rails 10 is a ramp, designated as a whole by the numeral 12. This ramp, as a whole, is curved longitudinally upwardly in a vertical plane, and its entire length is preferably one hundred and eighty feet, with a total rise of preferably three inches from either of its free ends to its highest point or crest thereof. The ramp 12 comprises elevating and lowering ramp-sections 13 and 14, the ramp-section 13 being preferably ninety feet long and the ramp-section 14 preferably sixty feet long. At their outer ends, the ramp-sections 13 and 14 have short dead ramp-sections 15, connected therewith and insulated therefrom, as shown at 16. These dead ramp-sections are preferably seven and one-half feet long and never have electrical connection with a source of current. Arranged between the inner ends of the ramp-sections 13 and 14 is an intermediate or crest dead ramp-section 17, which is preferably fifteen feet long and never has electrical connection with a source of current. This intermediate dead ramp-section is preferably horizontally arranged, with its opposite ends contiguous with and insulated from the inner ends of the ramp-sections 13 and 14, as shown at 18. It is thus seen that the highest point or crest of the ramp occurs at the ends of the intermediate dead ramp 17 or throughout its entire length.

The ramp or ramp-sections thereof are supported and held in place by vertically adjustable or longitudinally extensible supports 19, which are preferably identical, one of them being shown in detail in Figs. 3, 4 and 5, to which attention is now called. Each support comprises relatively longitudinally or vertically movable elements 20 and 21. The lower element 20 is provided at its lower end with an enlarged base 22, preferably cast integral therewith. This base is preferably rigidly connected to one of the cross ties 11 by means of bolts 23 or the like. In practice, I have found it advantageous to preferably move every ninth cross tie outwardly six inches, more or less, as illustrated in Fig. 1, whereby the vertical adjustable support arranged at this point, may be secured thereto, as above indicated.

The upper vertically adjustable element 21, is preferably formed in two members or parts 24, formed of suitably strong sheet or plate metal. The members 24 have their upper ends bent horizontally in opposite directions, providing horizontal arms 25, carrying at their outer ends jaws 26, receiving and overlapping the base of the ramp or ramp-sections, as shown. Insulating material 27 is interposed between the base of the ramp or ramp-section and the members 24, as shown. The contiguous faces of each inner member 24, and each lower element 20 are preferably provided with friction means, preferably in the form of horizontally arranged ribs or corrugations 24'. It is obvious that other friction means may be just as well employed, and I have found that some degree of success is obtainable by wholly dispensing with the friction means.

Means are provided to lock the element 21 in adjustment at a desired vertical position with relation to the element 20, preferably comprising a transverse clamping bolt 28, having a head 29, arranged within a longitudinally extending recess 30 formed upon one face of the element 20, and held by the longitudinal side walls thereof against turning movement. The bolt 28 passes through a longitudinal slot 31 formed through the element 20, such slot having free communication with the recess 30. The bolt 28 also passes through longitudinally extending slots 32 formed through the members 24 and in registration with each other and adapted for registration with the slot 31. The opposite end of the bolt 28 is screw-threaded, for receiving a nut 33, inwardly of which is preferably arranged a washer 34, as shown.

From the foregoing, it is obvious that the ramp or ramp-sections connected with the upper element 21, may be accurately vertically adjusted by proper manipulation of the bolt 28 and associate elements. After the adjustment, the nut 33 is screwed up whereby the elements 20 and 21 are positively locked together. By removing the nut 33 the members 24 may be separated, or assembled to release or receive the base of the ramp-section, the bolt 28 also serving to retain these parts together so that they securely hold the ramp-sections in place.

My ramp or ramp-sections are particularly well adapted for use in connection with mechanically operated and electrically controlled train stopping or signaling apparatuses, such as are illustrated in my copending application for mechanically operated electrically controlled train control system, filed July 12, 1911, Serial No. 638,108.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having described my invention, I claim:—

1. A ramp comprising elevating and lowering ramp-sections having their inner ends arranged in end to end relation and spaced a substantial distance, and a dead ramp-section interposed between the inner ends of the elevating and lowering ramp-sections, connected therewith, and insulated therefrom.

2. A longitudinally curved ramp comprising an elevating ramp-section over fifty feet long, a lowering ramp-section over fifty feet long arranged in end to end relation to the first named ramp-section, and a dead ramp-section over ten feet long arranged between, connected with, and insulated from the inner ends of the elevating and lowering ramp-sections.

3. A longitudinally curved ramp comprising an elevating ramp-section approximately ninety feet long, a lowering ramp-section approximately sixty feet long, and a dead ramp-section approximately fifteen feet long, arranged between, connected with, and insulated from the inner ends of the elevating and lowering ramp-sections.

4. A longitudinally curved ramp comprising an elevating ramp-section over fifty feet long, a lowering ramp-section over fifty feet long arranged in end to end relation to the first named ramp-section, a dead ramp-section over ten feet long, arranged between the inner ends of the elevating and lowering ramp-sections, connected therewith, and insulated therefrom, and dead ramp-sections over five feet long connected with the outer ends of the elevating and lowering ramp-sections.

5. A ramp over 100 feet long and curved longitudinally in a substantially vertical plane and comprising elevating and lowering ramp sections disposed in end to end relation, the elevating ramp section having a substantially greater length than the lowering ramp section.

In testimony whereof I affix my signature in presence of two witnesses.

WILLIAM B. MURRAY.

Witnesses:
G. ROSS WERTZ,
A. M. BUSHNELL.